United States Patent [19]
Depault

[11] Patent Number: 5,100,303
[45] Date of Patent: Mar. 31, 1992

[54] AGITATOR AND PUMP ASSEMBLY

[76] Inventor: Marcel Depault, 1337 rue Principale, St-Valérien, Co. Shefford, Quebec, Canada

[21] Appl. No.: 434,909

[22] Filed: Nov. 9, 1989

[51] Int. Cl.⁵ .................. F04B 17/00; F04B 35/00
[52] U.S. Cl. .................. 417/361; 417/900; 366/266; 366/285
[58] Field of Search ........ 417/900, 361, 360, 231; 415/62; 366/266, 190, 285, 262

[56] References Cited

U.S. PATENT DOCUMENTS

| | | | |
|---|---|---|---|
| 2,698,583 | 1/1955 | House et al. | 417/231 |
| 3,832,093 | 8/1974 | Shirek et al. | 417/231 |
| 3,910,722 | 10/1975 | Hochmuth | 417/231 |
| 4,175,916 | 11/1979 | Crisafulli | 417/231 |
| 4,594,006 | 6/1986 | Depault | 366/266 |
| 4,661,046 | 4/1987 | Ruyle | 417/900 |
| 4,685,868 | 8/1987 | Bodensteiner et al. | 417/900 |

FOREIGN PATENT DOCUMENTS

| | | | |
|---|---|---|---|
| 2364962 | 12/1973 | Fed. Rep. of Germany | 417/231 |
| 401317 | 2/1974 | U.S.S.R. | 417/231 |

Primary Examiner—Edward K. Look
Assistant Examiner—Hoang Nguyen
Attorney, Agent, or Firm—Samuel Meerkreebs

[57] ABSTRACT

An agitator and pump assembly adapted to be trailed behind a vehicle and to be moved into a manure pond, wherein the apparatus includes a pump housing at the end of an elongated frame supported on a wheeled sub-frame. The wheeled sub-frame is pivotally connected near one end to a midpoint of the elongated frame. The pump housing includes a rotating bladed impeller having an axis of rotation which is at an acute angle to the elongated frame, and a screw pump extends above the housing for thrusting the material downwardly through the housing upon rotation thereof.

4 Claims, 5 Drawing Sheets

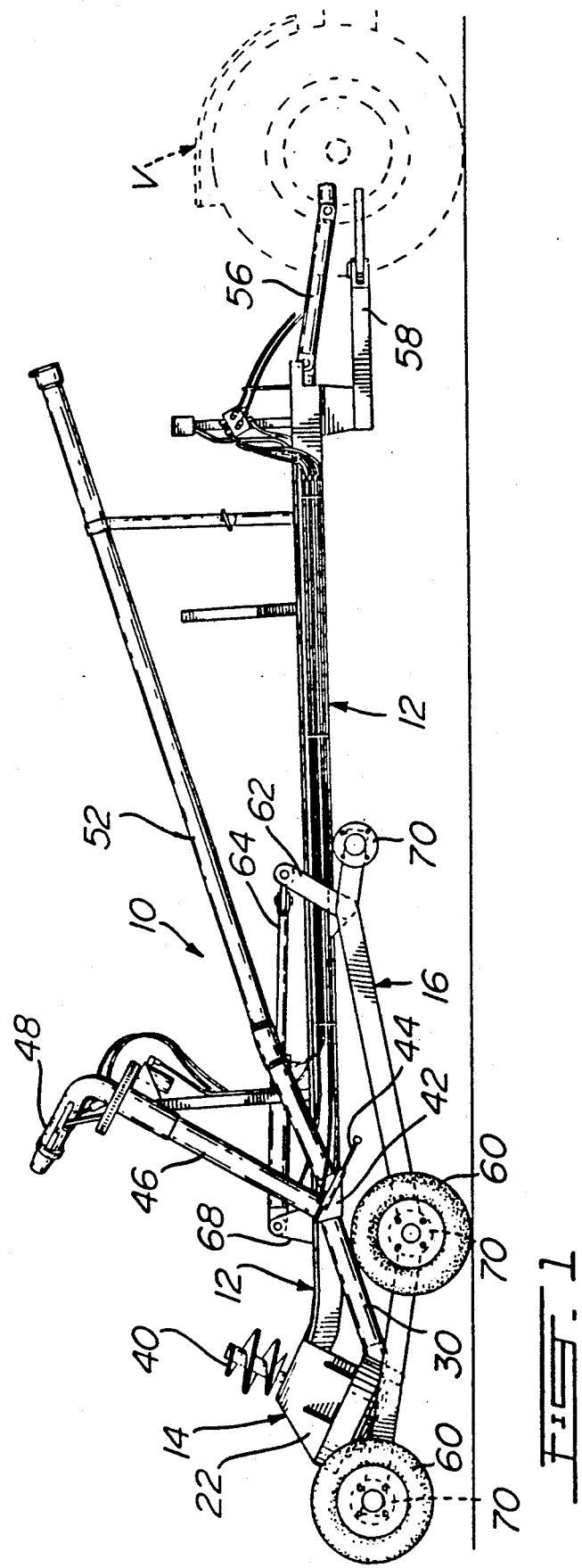

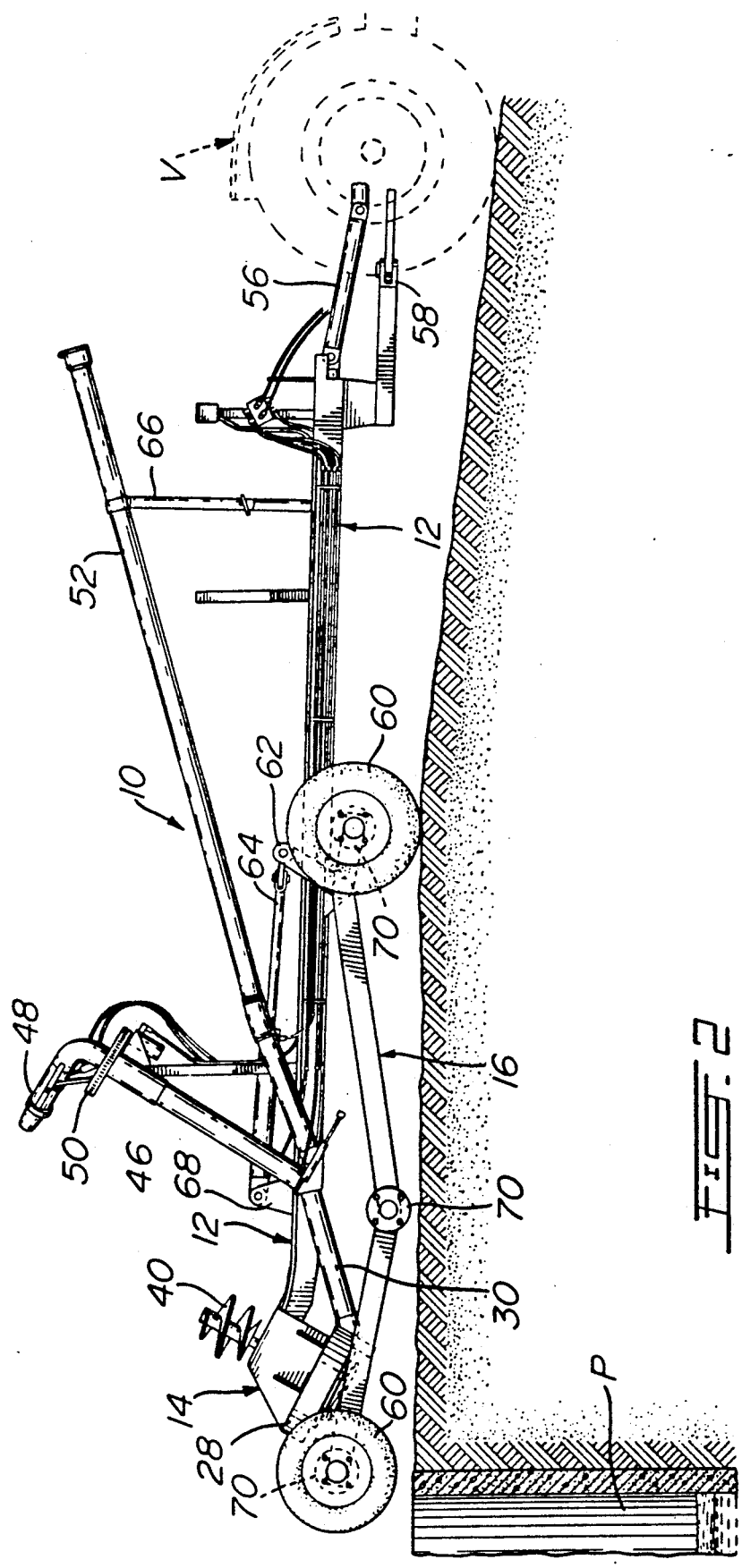

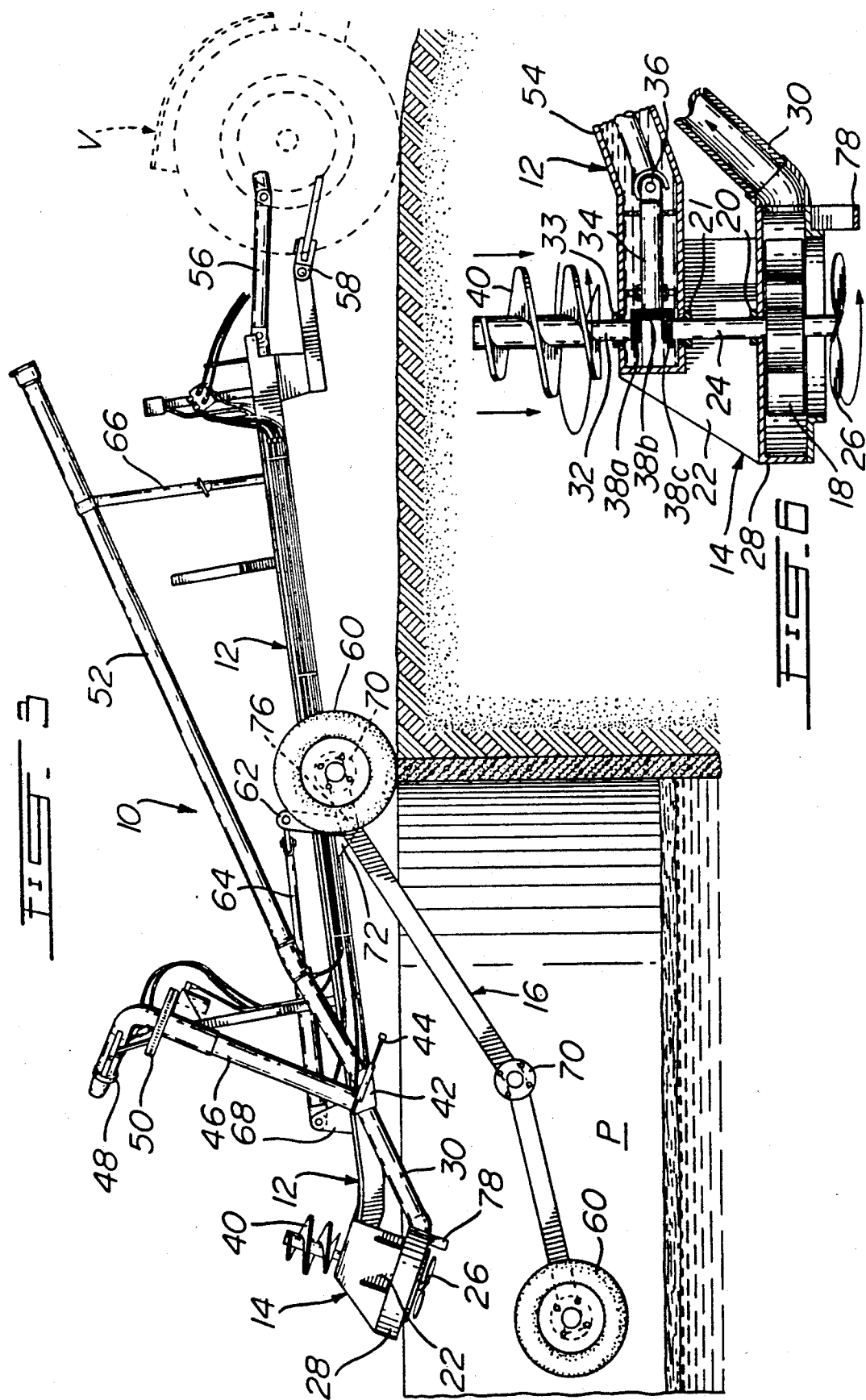

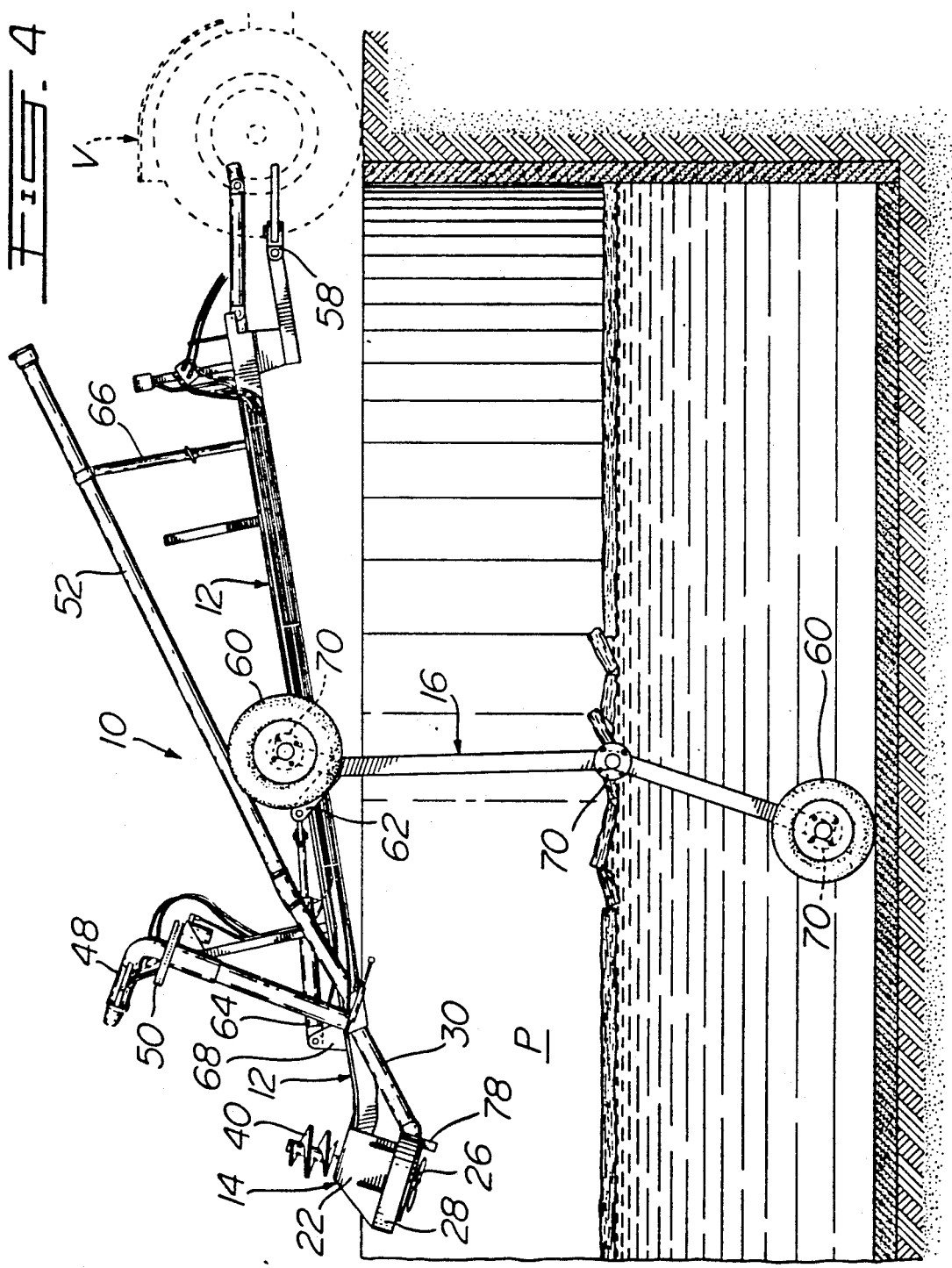

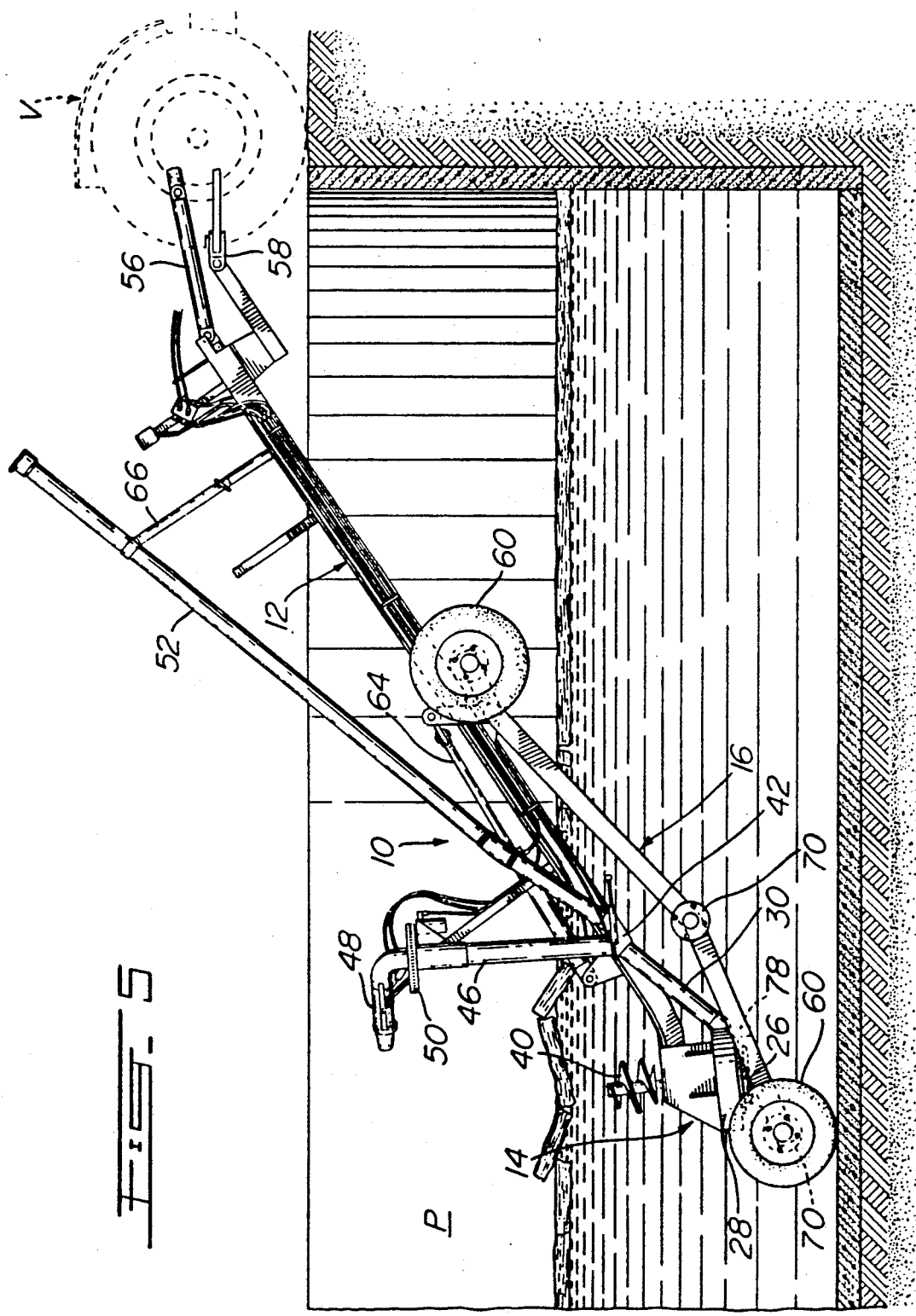

AGITATOR AND PUMP ASSEMBLY

BACKGROUND OF THE INVENTION

1. Field of the Invention

The present invention relates to an agitator and pump assembly for mixing and pumping slurry from holding ponds or lagoons in which animal manure is collected.

2. Description of the Prior Art

The inventor has obtained U.S. Pat. No. 4,594,006, issued June 10, 1986, relating to a pump for mixing and pumping manure ponds. Such ponds are a combination of liquid and layers of hand-caked dried solids. As described in the above-mentioned patent, a combination of a vertical screw pump and an impeller is proposed to handle the material. The screw pump provides a vertical component to the flow of the liquid and solids to break up the caked layers, and the impeller acts as a pump to evacuate the liquid and solids in suspension through a drainage pipe directed outboard the pond. The impeller can also be used to direct the liquid through a jet nozzle having a horizontal component for the purpose of breaking up the caked layers and causing the solids to be mixed and suspended in the liquid.

The device of the above patent is mounted on a frame which is meant to be set up vertically in the pond. Given that such ponds are of varied depths and that it is not always possible, in the case of a shallow pond, to place the frame with the associated screw pump in a vertical attitude, the practical benefits of such an apparatus may be limited, in a portable version.

SUMMARY OF THE INVENTION

It is an aim of the present invention to provide an improved apparatus of the type described in U.S. Pat. No. 4,594,006.

It is a further aim of the present invention to provide a portable agitator and manure pond pump which can be used in virtually any manure pond regardless of the depth.

It is a further aim of the present invention to provide an easily transportable agitator and manure pump apparatus which can be easily maneuvered by a conventional farm tractor and can be transported over roads by being trailed behind a light vehicle.

A construction in accordance with the present invention comprises an elongated frame member having a longitudinal axis. A pump housing is mounted at one end of the frame. A bladed impeller is mounted for rotation about a rotation axis in the pump housing. The axis of rotation of the impeller extends at an angle of between 30° and 45° from the longitudinal axis of the frame. A bladed thrust means is mounted for rotation, above the pump housing, in the axis of the rotary impeller. Means are provided for mounting the other end of the frame to a transport vehicle, and means are provided for supporting and locating the elongated frame in a manure pond with the axis of rotation of the impeller substantially vertical.

In a more specific embodiment of the present invention, the means for locating the elongated frame in the pond includes a sub-frame pivotally mounted to the elongated frame. Runner means are provided on the sub-frame. Positive means are provided for controlling the angle of the sub-frame relative to the elongated frame when the runner means are in contact with the bottom of a manure pond.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a side elevation view of the present invention in a transport position;

FIG. 2 is a side elevation of the device shown in FIG. 1 with the apparatus prepared to be put into operation;

FIG. 3 is a side elevation of the apparatus shown in FIG. 2 in a subsequent operative position;

FIG. 4 is a side elevation of the apparatus shown in FIG. 3 in a successive operative position;

FIG. 5 is a side elevation of the apparatus shown in FIG. 4 in a successive operative position,; and FIG. 6 is a fragmentary enlarged vertical cross-section of a detail shown in FIGS. 1 to 5.

DESCRIPTION OF THE PREFERRED EMBODIMENTS

An agitator and pump assembly 10 is illustrated in the drawings which includes an elongated frame 12 carrying a pump housing 14 at one end thereof. A sub-frame 16 is pivotally connected to the frame 12.

The pump housing 14 is mounted to the end of the frame 12 at an acute angle thereto.

As shown in FIG. 6, the pump housing 14 includes an impeller 18 fixed to a shaft 24 which is journaled in bearings 20 of impeller casing 28 and bearings 21 in the frame 12. A cutting wheel 26 in the form of a multi-bladed propeller is mounted to the bottom end of shaft 24. The impeller casing 28 communicates with the pipe 30 for discharging liquid from the pump housing 14. A pair of support plates 22 mounts the impeller casing 28 to the frame 12.

A shaft 32 is mounted in the same axis as the shaft 24 but on the opposite side of the frame 12 and extends upwardly from the pump housing 14. The shaft 32 mounts a spiral screw pump 40. It is contemplated that other thrust means could be provided, such as a multi-blade propeller. The shaft 32, which is journaled in bearings 33 in the frame 12, mounts bevel gear 38a which in turn meshes with bevel gear 38b on the end of drive shaft 34. Likewise, the shaft 24 mounts a bevel gear 38c which meshes with the bevel gear 38b.

The frame 12 is hollow and is formed by a rectilinear cylinder 54 which is sealed throughout. The cylinder 54 is provided with a lubricating oil in its interior, and this oil is prevented from escaping from the cylinder 54 by means of sealed bearings, etc. The axis of the shafts 24 and 32 is at an acute angle to the longitudinal axis of frame 12. The range of angles is preferably between 30° and 45°. The purpose of having the axis of the shafts 24 and 32 at an acute angle to the frame 12 will become evident as will be described hereinbelow.

The shaft 34 extends throughout the cylinder 54 and is connected at a universal joint 36 in the elbow of the angled portion of the frame 12.

The discharge pipe 30 communicates with either a drainage pipe 52 or a diversion pipe 46, depending on the position of the valve 42. The valve 42 can be either in a position to allow the liquid to pass through the diversion pipe 46 to the nozzle 48, or alternatively to the drainage pipe 52 to be loaded outboard of the pond P when in operation.

The valve 42 is controlled by hydraulic control 44.

A nozzle 48 is at right angles to the diversion pipe 46 and is rotated by means of a rotary cable 50 operated by a hydraulic motor associated with the cable 50.

The other end of the drive shaft 34 is coupled to a drive shaft 56, off a typical tractor vehicle V. The frame 12 is detachably connected to the vehicle V by means of a hitch 58. A drain pipe 52 is supported on the frame 12 at its outby end by means of a support 66 which may be hydraulically extendable.

The frame 12 may, in one embodiment, be cantilevered to the end of the tractor V, and in such a case, hydraulic cylinders would be provided for lifting the cantilevered frame in and out of the pond.

A preferred embodiment is shown in the drawings which includes a sub-frame 16 which is pivoted to a pivot bracket 72 on the frame 12. The sub-frame 16 may be in the form of a pair of parallel legs which are bent at 74 and at 76. Wheels 60 are mounted on the sub-frame 16, and a hydraulic ram 64 is mounted to a bracket 68 on the frame 12 which operates the dog-leg lever 62 fixed to the sub-frame 16 at the pivot point 76.

FIGS. 1 to 4 show the successive operative positions of the agitator and pump assembly 10. FIG. 1 shows the apparatus 10 in its transport position. It will be noted that a set of wheels 60 is provided in the area of the bent portion 74 of the legs forming the sub-frame 16 and have been removed from the wheel mounting 70.

The frame 12 can be mounted to the rear of a lightweight vehicle, such as a pickup truck or even an automobile, for road transport. When it is required to drain a pond typically filled with animal manure, the wheels 60 are moved away from the bent portion 74 and are mounted to the wheel mounting 70 at the end of the legs forming the sub-frame 16, and the vehicle is made to advance the apparatus 10 towards the pond P as shown in FIG. 2.

As illustrated in FIG. 3, the agitator and pump assembly 10 is backed until the rear wheels 60 are on the edge of the pond P, at which point the vehicle is halted. The ram 64 is then operated to move lever 62 counterclockwise until the front wheels 60 break through the crust formed on the liquid in the pond and engage the floor of the pond P as shown in FIG. 4. The vehicle V is then made to move backwards further as the sub-frame is supported by the lower wheels 60, and then the ram is actuated to allow the pump housing 14 on the frame 12 to be lowered into the pond P by pivoting about the hitch 58.

FIG. 5 illustrates a position wherein the pump housing 14 is nearer the bottom of the pond P. The frame 12 and pump housing 14 can be lowered to approximately 6 inches from the bottom of the pond P. The pump is then actuated by means of drive shaft 34 so that both the impeller 18 and the screw 40 are rotated. The screw 40, by rotating, draws the liquid and portions of the crust downwardly against the pump housing, and the impeller 18 sucks the liquid from the bottom to pump the liquid through the pipe 30. The multi-bladed cutting device 26 will shred hay and other debris in order to allow the liquid material to pass through the impeller 18 and pipe 30. At the beginning of an operation, the liquid will be diverted through the diversion pipe 46 through the nozzle 48 which will be forced back into the pond P. However, by controlling the angle of the nozzle 48, the operator can help to break up the crust which is normally at the surface of the pond over the liquid. At the same time, the recirculation of the liquid through the impeller 18, diversion pipe 46, and nozzle 48, causes the solid particles to be broken up into smaller pieces, thereby rendering the material more liquefied.

Once the liquid manure is of a suitable consistency, the valve control 44 will be operated to change the position of the valve 42 and divert the liquid from pipe 30 through to drain pipe 52 which will be connected up to a liquid storage tank on a vehicle which will then be utilized to transport and spread the manure on fields.

As can be seen from the drawings, the acute angle of the shaft as relative to the frame 12 enables the apparatus to be used in shallow ponds P and at different levels of the pond P with the screw 40 substantially vertical. It is understood that the axis will not be exactly vertical, but the thrust will cause the flow to move downwardly towards the pump housing 14, and the impeller 26 can be made to approach the bottom of the pond P. A protecting bar 78 will be provided underneath the impeller casing to support the casing on the bottom floor and prevent the cutting wheel 26 from being damaged.

I claim:

1. An agitator and pump assembly comprising an elongated first frame member having a longitudinal axis, a pump housing mounted at one end of the first frame, a bladed impeller mounted for rotation about a rotation axis in the pump housing, the impeller rotation axis extending at an angle of between 30° and 45° from the longitudinal axis of the frame, means provided for mounting the other end of the frame to a transport vehicle, including second frame means to which the first frame is articulated and means are provided for moving the first frame relative to the second frame to change the angular disposition of the first frame thereto, a third frame pivotally mounted at one end to the elongated first frame member, wheel means provided on the other end of the third frame member, positive means for controlling the angle of the third frame relative to the elongated first frame when the wheel means are in contact with the bottom of a manure pond, such that the third frame supports the first frame member at different angular positions with the pump housing in the pond.

2. An apparatus as defined in claim 1, wherein the third frame is an elongated dog-leg frame with the wheel means mounted at each end thereof, and a lever is provided at one end of the third frame at the pivot point with the first frame, and hydraulic ram means are provided for activating the lever means such that the third frame can be angled relative to the elongated first frame to position the pump housing at different vertical attitudes within the pond.

3. An apparatus as defined in claim 1, wherein the pump housing includes a pipe extending on the first frame, from and communicating with the impeller, such that liquid is pumped from the impeller through said pipe to alternatively: a recirculating nozzle, or a drainage pipe which carries the material outboard of a pond.

4. An apparatus as defined in claim 1, wherein a bladed thrust means in the form of a screw conveyor extends in a spiral on a shaft with the shaft extending in the axis of rotation of the impeller and is connected thereto and extends along the first frame.

* * * * *